(No Model.)
D. B. MORRISON.
FILTER.
No. 605,500. Patented June 14, 1898.
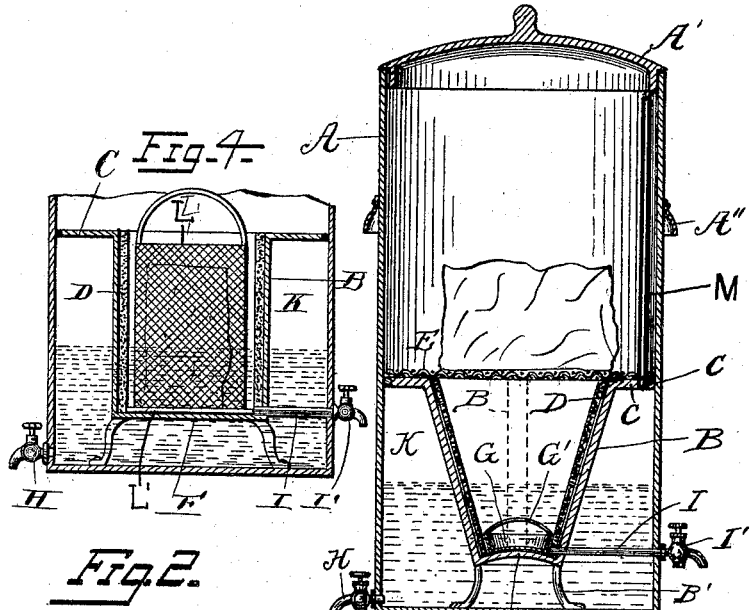
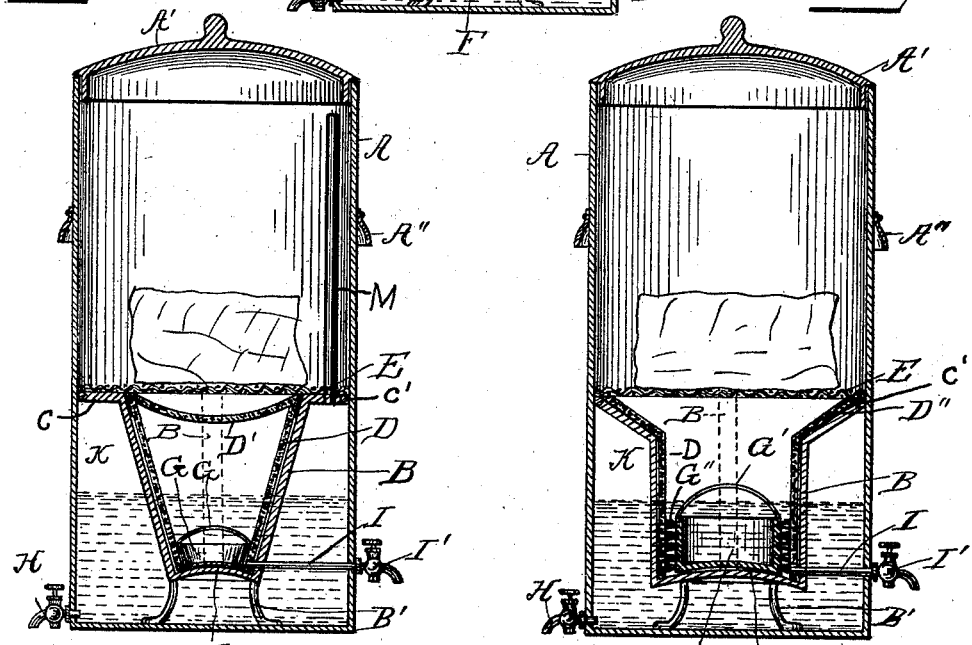
WITNESSES.
Albert Popkins
W. C. Roberts
INVENTOR
D. B. Morrison
By A. E. Glasscock
Attorney

UNITED STATES PATENT OFFICE.

DAVID B. MORRISON, OF KANSAS CITY, MISSOURI.

FILTER.

SPECIFICATION forming part of Letters Patent No. 605,500, dated June 14, 1898.

Application filed September 21, 1897. Serial No. 652,458. (No model.)

*To all whom it may concern:*

Be it known that I, DAVID B. MORRISON, a citizen of the United States, residing at Kansas City, in the county of Jackson and State of Missouri, have invented certain new and useful Improvements in Filters; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention has relation to improvements in filters; and it consists in the novel construction and arrangement of its parts, as hereinafter described.

The object of the invention is to construct a filter which can be placed in any cooler without altering the construction of the cooler and which can be easily cleaned and removed from the cooler when desired.

The further object of the invention is to provide a filter which will be protected and not easily broken and which will be simple in construction and cheap in manufacture.

In the accompanying drawings, Figure 1 is a sectional view of a cooler with my improved filter placed therein. Fig. 2 is a sectional view of the cooler, showing a modified form of the filter. Fig. 3 is a sectional view of the cooler, showing another modification; and Fig. 4 is a sectional view of the lower portion of the cooler, showing still another modified form of the filter.

The cooler A is provided with the usual top A' and the handles A². Resting on the bottom of the cooler is the filter-frame B, which is supported by means of the legs B'. The open frame B, as shown in Figs. 1 and 2, has slanting sides and a flat horizontal portion C. The horizontal portion C is also shown in Fig. 4. The horizontal portion C is provided with an annular groove in which is located a gasket C'. Said gasket is adapted to bear against the inner walls of the cooler and maintain a water-tight joint. The filter-frame B supports and holds in position the filtering-wall D, which consists of a ring open at the top and bottom, of any suitable filtering material—such as stone composition, &c. The screen E is adapted to rest on top of the filter-frame B, the said screen preventing the ice and other articles from reaching the filtering material and thereby protecting the same. The bottom of the filtering-frame B, as shown in Figs. 1, 2, and 3, is convexed, as at F, and resting on the convexity F is a pan G, which is provided with a suitable handle G'. The cock H connects with the interior of the cooler. The pipe I leads from the exterior of the cooler into the interior of the filtering-wall, and the outer end of said pipe I is provided with a cock I'.

In the form of the device as shown in Fig. 4 the receptacle L is adapted to contain the ice, said receptacle being made of wire-netting or other suitable material. The said receptacle is adapted to slip between the walls of the filtering material, and the said receptacle is retained in proper position within the filtering material by means of the bottom L', which comes in contact with the inner faces of the filtering material and the frictional contact between the edges of the bottom L', and the inner face of the filtering material prevents the ice from floating the receptacle L out. Thus the water in the lower part of the cooler will be kept cool. In order to equalize the air-pressures above and below the horizontal portion C, the lower end of the pipe M passes through the said portion C, the upper end of said pipe extending up and terminating in the vicinity of the upper end of the cooler. Furthermore, by means of the said pipe M the cold air from the upper portion of the cooler may enter the portion of the cooler below the horizontal portion C, and thus water in the bottom of the cooler is refrigerated.

In operation water is poured into the cooler, which passes through the filtering material D into the chamber K in a filtered condition, and it is then drawn off when desired through the cock H. Any sediment which does not pass through the filtering-wall will fall into the pan G, which can be removed by means of the handle G' when it is desired to clean the filter. Any water or dirt which may have been deposited on the bottom of the filter-frame F can pass through the pipe I by simply tilting the cooler and opening the cock I'.

In Fig. 2 an additional filter-plate D' is provided, which forms a cover for the filtering-ring D. By this construction the water is first filtered through the plate D' before passing through the filtering-ring D. This filtering-plate D' can be made removable in order to remove the pan G.

In Fig. 3 the filter-frame B is provided with vertical walls and the filtering-walls D². In this modification I provide the pan G with brushes G² on the outer surface, so that when the pan is revolved by means of the handle G' the brushes will bear against the vertical walls of the filter D and clean the same.

By the construction which has just been described it will be noticed that the filter-frame carrying the filtering-walls and screen E can be placed in any cooler without altering the construction thereof, and a filter is thus obtained with but little expense.

When it is desired to remove the filtering-frame, the pipe I is disconnected from the filter-frame, and thus the frame is free to be lifted out.

In the form of the invention as shown in Fig. 4 to clean the perpendicular walls of the ring D the receptacle L is lifted out and the edges of the bottom L', scraping against the inner faces of the ring D, scrapes off the dirt, &c.

Having thus described my invention, what I claim, and desire to secure by Letters Patent, is—

1. The combination with a cooler of a filter-frame supported on the bottom of the cooler, the top portion of the frame forming a water-tight joint with the side of the cooler, a filtering-wall supported by the filter-frame and the removable pan supported by the filter-frame and located adjacent the lower portion of the filter-wall.

2. The combination with a cooler of a filter-frame resting on the bottom of the cooler having its upper portion forming a water-tight joint with the sides of the cooler, a filtering-wall supported by the filter-frame, a convexed bottom for the filter-frame, a removable pan resting on the bottom and a drain-pipe leading through the various walls to the outside of the cooler.

3. The combination with a cooler of a filter-frame resting on the bottom of the cooler having its upper edge forming a water-tight joint with the sides of the cooler, a filtering-wall supported by the filtering-frame, a removable pan resting on the bottom of the filter-frame and a brush on the outside of the pan bearing against the filter-wall and adapted to clean the same when the pan is removed.

4. The combination with a cooler of a filter-frame resting on the bottom of the cooler having its upper edge forming a water-tight joint with the sides of the cooler, a suitable wall supported by the filter-frame, an air-pipe passing at its lower end through the filter-frame, and opening into the compartments above and below the filter-frame.

In testimony whereof I affix my signature in presence of two witnesses.

DAVID B. MORRISON.

Witnesses:
KITTIE REES,
W. C. EBERT.